H. A. SHEETZ, Jr.
VULCANIZER IGNITER.
APPLICATION FILED NOV. 16, 1920.

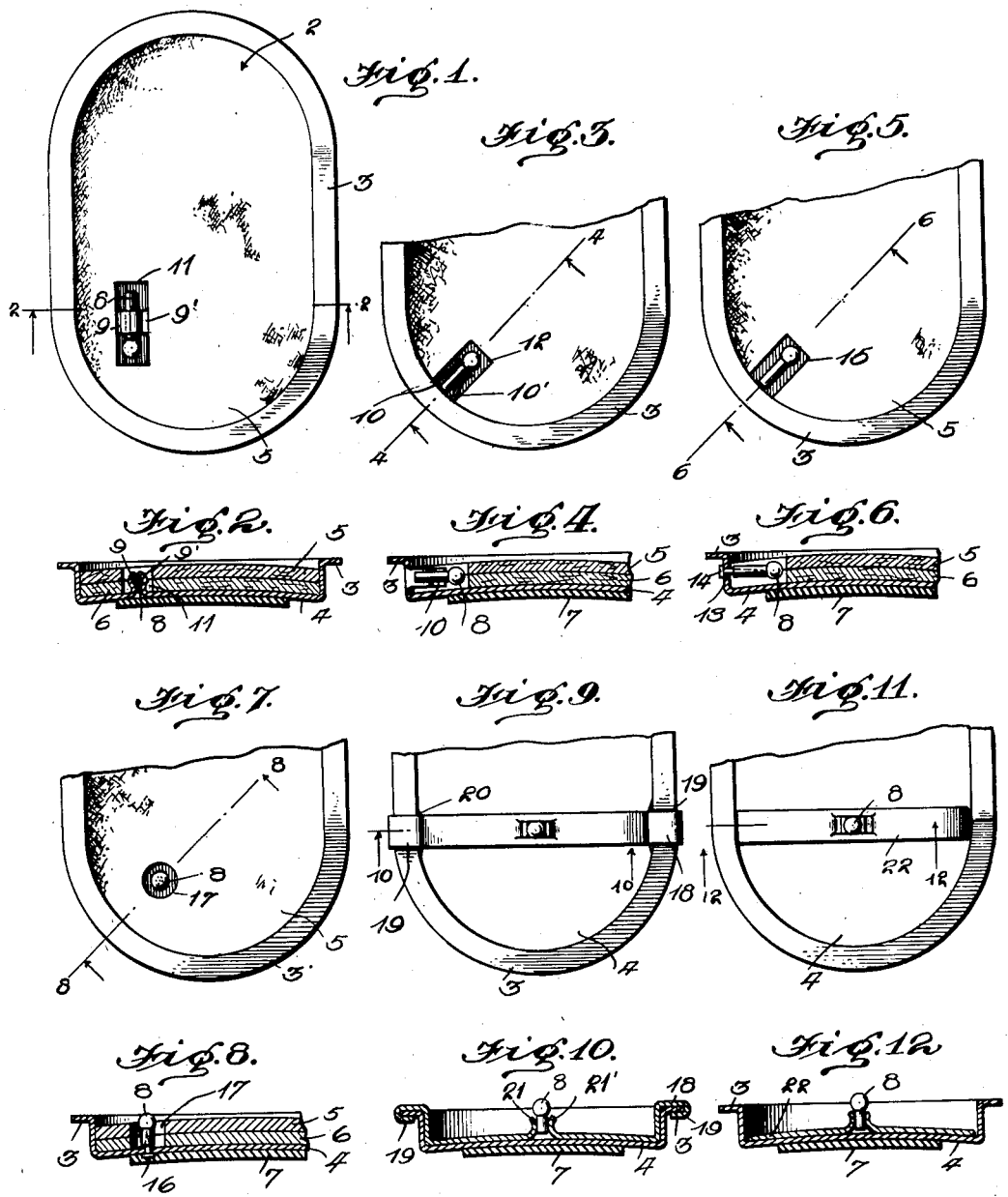

1,396,068.

Patented Nov. 8, 1921.
2 SHEETS—SHEET 2.

INVENTOR.
Harry A. Sheetz, Jr.
BY Wm. J. Sheetz
his ATTORNEY.

UNITED STATES PATENT OFFICE.

HARRY A. SHEETZ, JR., OF NEW YORK, N. Y.

VULCANIZER-IGNITER.

1,396,068.

Specification of Letters Patent.   Patented Nov. 8, 1921.

Application filed November 16, 1920. Serial No. 424,344.

*To all whom it may concern:*

Be it known that I, HARRY A. SHEETZ, Jr., a citizen of the United States, residing at New York, in the county of Bronx and State of New York, have invented certain new and useful Improvements in Vulcanizer-Igniters, of which the following is a specification.

This invention relates to improvements in vulcanizer igniters, and more particularly to the small portable class in which dry fuel, such as impregnated cardboard or paper is employed to produce the necessary heat.

This class is used extensively in making quick vulcanizing repairs on the road, and difficulty is frequently encountered in igniting the fuel in the ordinary way with a match when any appreciable wind is blowing. Therefore, an object of this invention is to provide a positive means whereby the fuel may be ignited by friction in a simple manner, employing, for example, sand paper, a file, or any suitable object that may be convenient; it is especially an object of this invention to provide a means for holding a match or other convenient combustible material which upon abrasion ignites; and to simplify and improve the construction of devices of this character.

With these and other objects in view the invention is complete in the construction, the combination, the detail, and arrangement of parts as hereinafter more fully described and claimed.

In the drawings:

Figure 1 is a plan view of the form of this device;

Fig. 2 is a section at 2—2 of Fig. 1;

Fig. 3 is a fragmentary plan of a modified form;

Fig. 4 is a section at 4—4 of Fig. 3;

Fig. 5 is a fragmentary plan of another modified form;

Fig. 6 is a section at 6—6 of Fig. 5;

Fig. 7 is a fragmentary plan of another modified form;

Fig. 8 is a section at 8—8 of Fig. 7;

Fig. 9 is a fragmentary plan of another modified form;

Fig. 10 is a section at 10—10 of Fig. 9;

Fig. 11 is a fragmentary plan of another modified form;

Fig. 12 is a section at 12—12 of Fig. 11;

Figure 13:
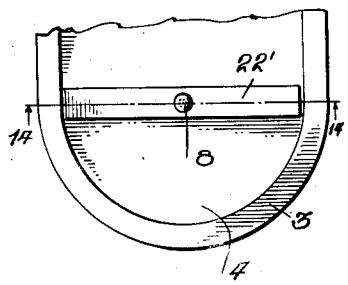
Fig. 13 is a fragmentary plan of another modified form.

In the embodiment of my invention there is provided a receptacle 2, preferably stamped out of sheet metal, and having a flanged top 3 and a concaved bottom 4. The receptacle 2 contains several fuel elements, as 5 and 6, arranged over each other and formed preferably of soft straw-board impregnated with a solution of potassium nitrate, or a similar substance, and dried, in order that they may carry fire and glow without flame until consumed, so as to produce the heat necessary for the vulcanizing process.

A repair patch 7 formed of pure soft rubber adheres to the concave bottom of the receptacle 2, and in practice, the receptacle 2 is placed upon the tube or article to be repaired with the patch 7 in contact therewith, and is firmly clamped into position in any suitable manner. The fuel elements 5 and 6 are then ignited and vulcanization proceeds.

I am aware that this principle and structure is old to the art, but in order to avoid the use of matches for ignition, I provide a match element 8, which is shown in Fig. 1, retained by a pair of clips 9 and 9' stamped out of the bottom of the receptacle 2. A part of the metal of the receptacle is punctured and thrown up to form the clips or clamps 9 and 9' to retain the match head or other similar material which acts as the igniting agent. The generic feature of this invention may be violated by the use of such clips as shown in Fig. 2 pressed from the side of the metal container, the clips there being indicated as 10 and 10'.

Figure 15:
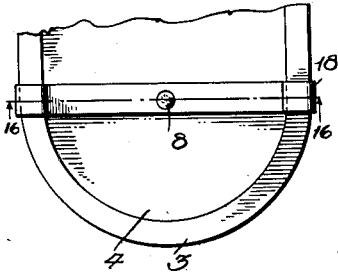
Fig. 15 is a fragmentary plan of another modified form.
Figure 17:
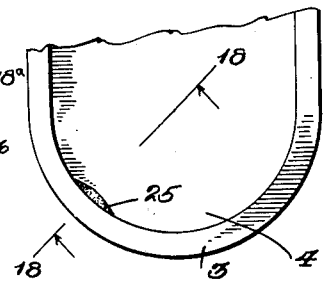
Fig. 17 is a fragmentary plan of another modified form.
Figure 14:
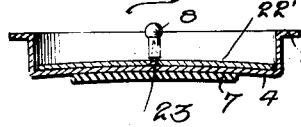
Fig. 14 is a section at 14—14 of Fig. 13.
Figure 16:
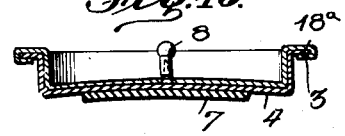
Fig. 16 is a section at 16—16 of Fig. 15.
Figure 18:
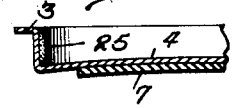
Fig. 18 is a section at 18—18 of Fig. 17.
Figure 19:
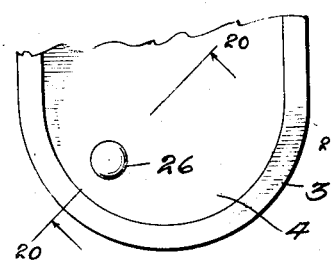
Fig. 19 is a fragmentary plan of another modified form.
Figure 21:
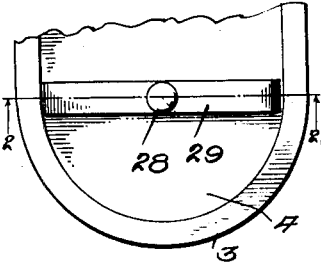
Fig. 21 is a fragmentary plan of another modified form.
Figure 23:
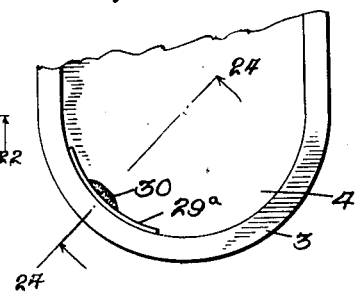
Fig. 23 is a fragmentary plan of another modified form.
Figure 20:
Fig. 20 is a section at 20—20 of Fig. 19.
Figure 22:
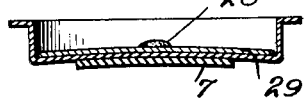
Fig. 22 is a section at 22—22 of Fig. 21.
Figure 24:
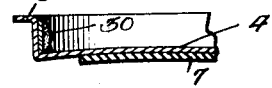
Fig. 24 is a section at 24—24 of Fig. 23.

In the form shown in Fig. 1, the cardboard is perforated as at 11, and in the form shown in Fig. 3, the card-board is notched as shown at 12. In Fig. 5, is shown another modified form in which the metallic receptacle 2 is perforated at 13 to receive a pin 14, which pin 14 forms a stud or retainer for the match or other abrasive element, and the card-board is notched as at 15. The generic feature of this invention may be violated by the use of a structure such as is shown in Fig. 5 or by the structure shown in Fig. 7, in which the perforation is in the bottom of the receptacle as in 16 with a pin similar to the pin 14 passing therethrough and a circular hole 17 provided in the cardboard; or the generic feature of this invention may be violated by the structure shown in Fig. 9, in which there is provided a saddle 18 provided with bent over ends forming a slide 19 to seat itself upon the receptacle 2 as at 20 and which is stamped out to form a pair of clips 21 and 21' similar to the clips shown in Fig. 1; or the generic feature of this invention may be violated by the use of the structure shown in Fig. 11, in which a flat strip 22 is inserted into the bottom of the receptacle 2 and stamped out in a similar manner as the strip 18 as shown in Fig. 9, the card-board being perforated in a similar manner to that shown in Fig. 4 as indicated by the numeral 17. Or a further modification may be provided in providing a strip 22' similar to strip 22 in which a pin 23 is inserted, functioning similar to the pin in Fig. 4; or a further modification may be provided as illustrated in Fig. 15, in which a pin 24 is inserted in a saddle 18ᵃ similar to saddle 18 shown in Fig. 9; or it may be further modified as shown in Fig. 17, in which an ignition paste 25 is affixed to the side of the receptacle 2, or a paste 26 is affixed to the bottom of the receptacle 2, or in which the said paste is affixed as at 28 to the strip 29 similar to the strip 22 as shown in Fig. 11, the last modification being shown in Fig. 21; or it may be further modified by providing an arcuate strip 29ᵃ inserted in the corner of the receptacle as shown in Fig. 23, upon which strip is affixed a paste 30.

While I have above shown various modifications and alternative forms of this device, here illustrated for the purpose of showing how the generic features of this invention may be infringed and for the purpose of laying a foundation for broad claims herein, it is understood, however, that the preferred form of my device is the one shown in Fig. 1 and that the pursuing of claims for specific structure therein is intended to be done without prejudice to separate applications upon other specific structures herein shown.

Claims:

1. In a vulcanizer igniter, the combination with a fuel element, of a receptacle for the same, and means projecting from the receptacle into an opening within the fuel element for igniting the fuel element.

2. In a vulcanizer igniter, the combination with a fuel element, of a receptacle for the same, the said receptacle provided with an extensible portion extending into the fuel element for mounting an igniter for the fuel element.

3. In a vulcanizer igniter, the combination with a fuel element, of a receptacle for the same, the said fuel element cut away to provide for an extension from the receptacle, and an ignition element mounted on said extension.

4. In a vulcanizer igniter, the combination with a fuel element, of a receptacle for the same, the said receptacle punched to provide clips for holding an igniter for said fuel elements.

5. In a vulcanizer igniter, the combination with a fuel element, of a receptacle for the same, the said receptacle being punched at the bottom interior of said receptacle to form a pair of clips for holding a match, the said fuel element being recessed to admit of said match and clips.

In testimony whereof I affix my signature.

HARRY A. SHEETZ, Jr.